(12) United States Patent
Bomzer et al.

(10) Patent No.: US 11,635,025 B2
(45) Date of Patent: Apr. 25, 2023

(54) GAS TURBINE ENGINE WITH FORWARD MOMENT ARM

(71) Applicant: United Technologies Corporation, Hartford, CT (US)

(72) Inventors: David Bomzer, West Hartford, CT (US); Frederick M. Schwarz, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 2280 days.

(21) Appl. No.: 14/432,289

(22) PCT Filed: Sep. 27, 2013

(86) PCT No.: PCT/US2013/062104
§ 371 (c)(1),
(2) Date: Mar. 30, 2015

(87) PCT Pub. No.: WO2014/099085
PCT Pub. Date: Jun. 26, 2014

(65) Prior Publication Data
US 2015/0240725 A1 Aug. 27, 2015

Related U.S. Application Data

(60) Provisional application No. 61/789,275, filed on Mar. 15, 2013, provisional application No. 61/708,240, filed on Oct. 1, 2012.

(51) Int. Cl.
*F01D 5/02* (2006.01)
*F02C 7/20* (2006.01)
(Continued)

(52) U.S. Cl.
CPC ................ *F02C 7/20* (2013.01); *F02C 3/107* (2013.01); *B64D 2027/262* (2013.01);
(Continued)

(58) Field of Classification Search
CPC .. F01D 5/027; F02C 3/10; F02C 3/107; F02C 7/20; F02C 7/36; B64D 27/10;
(Continued)

(56) References Cited

U.S. PATENT DOCUMENTS 4,784,012 A    11/1988   Marra
5,240,377 A *   8/1993   Farr ...................... B29C 70/083
                                                                     416/224

(Continued)

FOREIGN PATENT DOCUMENTS

EP      2270361 A2    1/2011
EP      2332835 A2    6/2011

OTHER PUBLICATIONS

European Search Report for EP Application No. 13865250.8 dated Oct. 30, 2015.
(Continued)

*Primary Examiner* — J. Todd Newton
*Assistant Examiner* — Behnoush Haghighian
(74) *Attorney, Agent, or Firm* — Carlson, Gaskey & Olds, P.C.

(57) ABSTRACT

A gas turbine engine includes a plurality of fan blades rotatable about an axis, wherein each of the plurality of fan blades includes a leading edge. The gas turbine engine also includes turbine section includes an aft most turbine blade having a trailing edge and a geared architecture driven by the turbine section for rotating the plurality of fan blades about the axis. A center of gravity of the gas turbine engine is located a first axial distance from the trailing edge of the aft most turbine blade that is between about 35% and about 75% of a total length between the leading edge of the plurality of fan blades and the trailing edge of the aft most turbine blade.

20 Claims, 2 Drawing Sheets

(51) Int. Cl.
*F02C 3/107* (2006.01)
*B64D 27/26* (2006.01)
*F02C 7/36* (2006.01)
*B65D 27/26* (2006.01)

(52) U.S. Cl.
CPC .............. *B65D 27/26* (2013.01); *F01D 5/027* (2013.01); *F02C 7/36* (2013.01); *F05D 2250/30* (2013.01); *Y02T 50/60* (2013.01); *Y10T 29/49321* (2015.01)

(58) Field of Classification Search
CPC ........ B64D 27/12; B64D 27/14; B64D 27/16; B64D 27/18; B64D 27/20; B64C 1/16; B64C 3/32
See application file for complete search history.

(56) References Cited

U.S. PATENT DOCUMENTS

| | | | |
|---|---|---|---|
| 5,319,922 A | 6/1994 | Brantley | |
| 5,524,847 A * | 6/1996 | Brodell | B64C 7/02 |
| | | | 60/797 |
| 6,471,485 B1 | 10/2002 | Rossmann et al. | |
| 6,537,022 B1 * | 3/2003 | Housley | F01D 25/246 |
| | | | 415/209.2 |
| 6,708,482 B2 | 3/2004 | Seda | |
| 6,871,820 B2 * | 3/2005 | Wilksch | B64D 27/04 |
| | | | 244/54 |
| 6,883,303 B1 | 4/2005 | Seda | |
| 7,371,042 B2 | 5/2008 | Lee | |
| 7,374,403 B2 * | 5/2008 | Decker | F01D 5/141 |
| | | | 416/223 R |
| 7,762,086 B2 * | 7/2010 | Schwark | F01D 25/285 |
| | | | 239/265.11 |
| 7,890,249 B2 | 2/2011 | Davis et al. | |
| 8,001,791 B2 | 8/2011 | Somanath et al. | |
| 8,104,708 B2 | 1/2012 | Chouard et al. | |
| 2004/0198852 A1 | 10/2004 | Lin et al. | |
| 2008/0046168 A1 | 2/2008 | McCarthy et al. | |
| 2009/0320286 A1 | 12/2009 | Walters | |
| 2010/0127496 A1 * | 5/2010 | Burkholder | F01D 9/065 |
| | | | 290/46 |
| 2010/0206981 A1 | 8/2010 | Baillard | |
| 2011/0001002 A1 | 1/2011 | Chouard et al. | |
| 2011/0056213 A1 | 3/2011 | Somanath et al. | |
| 2011/0079679 A1 | 4/2011 | Journade et al. | |
| 2011/0127368 A1 | 6/2011 | Penda et al. | |
| 2011/0272553 A1 | 11/2011 | Alexander et al. | |
| 2012/0198817 A1 | 8/2012 | Suciu et al. | |

OTHER PUBLICATIONS

International Preliminary Report on Patentability for PCT Application No. PCT/US2013/062104, dated Apr. 16, 2015.
International Search Report and Written Opinion for International Application No. PCT/US2013/062104 dated Jul. 10, 2014.

* cited by examiner

GAS TURBINE ENGINE WITH FORWARD MOMENT ARM

CROSS REFERENCE TO RELATED APPLICATION

This application claims priority to U.S. Provisional Application No. 61/708,510 filed on Oct. 1, 2012.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Structures of a gas turbine engine contribute to an overall weight of the engine and balance point is defined at center of gravity. The location of the center of gravity of a gas turbine engine influences how an engine is mounted and how surrounding nacelle structures are configured. A center of gravity moved forward along an engine axis increases an internal moment arm and thereby increases load on engine mounting structures. The location of the engine center of gravity is influenced by selections of materials and component configurations.

Although geared architectures have improved propulsive efficiency, turbine engine manufacturers continue to seek further improvements to engine performance including improvements to thermal, transfer and propulsive efficiencies.

SUMMARY

A gas turbine engine according to an exemplary embodiment of this disclosure, among other possible things includes a plurality of fan blades rotatable about an axis, each of the plurality of fan blades including a leading edge, a turbine section including an aft most turbine blade having a trailing edge, and a geared architecture driven by the turbine section for rotating the plurality of fan blades about the axis, wherein a center of gravity of the gas turbine engine is located a first axial distance from the trailing edge of the aft most turbine blade that is between about 35% and about 75% of a total length between the leading edge of the plurality of fan blades and the trailing edge of the aft most turbine blade.

In a further embodiment of the foregoing gas turbine engine, the center of gravity is disposed substantially along the axis.

In a further embodiment of any of the foregoing turbine engine embodiments, the center of gravity is determined including weights of structures comprising the gas turbine engine not including engine mounting structures, engine cowling structures and nacelle structures.

In a further embodiment of any of the foregoing turbine engine embodiments, the center of gravity is determined including weights of fluids contained within operating systems of the gas turbine engine.

In a further embodiment of any of the foregoing turbine engine embodiments, the first axial distance is between about 40% and about 70% of the total length between the leading edge of the plurality of fan blades and the trailing edge of the aft most turbine blade.

In a further embodiment of any of the foregoing turbine engine embodiments, the plurality of fan blades are supported on a rotor with the rotor and fan blades having a density of between about 0.0094 lbs/ lbs/in$^3$ and about 0.01540 lbs/ lbs/in$^3$.

In a further embodiment of any of the foregoing turbine engine embodiments, the geared architecture comprises a gearbox having a density of between about 0.22 lbs/in$^3$ and about 0.30 lbs/in$^3$.

In a further embodiment of any of the foregoing turbine engine embodiments, the center gravity is located at an intersection of a vertical line extending through a hoist point of the gas turbine engine and the axis with the axis normal to the vertical line.

Another gas turbine engine according to an exemplary embodiment of this disclosure, among other possible things includes a plurality of fan blades rotatable about an axis, each of the plurality of fan blades including a leading edge, a turbine section including an aft most rotating turbine blade having a trailing edge, and a geared architecture driven by the turbine section for rotating the plurality of fan blades about the axis, wherein an internal moment arm of the turbofan engine comprises a ratio of first distance from a center of gravity of the turbofan engine to the trailing edge of the aft most rotating turbine blade to a total length between the leading edge of the plurality of fan blades and the trailing edge of the aft most turbine blade that is between about 35% and about 75%.

In a further embodiment of the foregoing gas turbine engine, the ratio is between about 40% and 70%.

In a further embodiment of any of the foregoing gas turbine engines, the geared architecture comprises gearbox having a density of between about 0.22 lbs/in$^3$ and about 0.30 lbs/in$^3$.

In a further embodiment of any of the foregoing gas turbine engines, including a rotor supporting the plurality of fan blades with the rotor and fan blades having a density of between about 0.0094 lbs/in$^3$ and about 0.01540 lbs/in$^3$.

In a further embodiment of any of the foregoing gas turbine engines, the center of gravity is determined including weights of fluids contained within operating systems of the turbofan engine.

In a further embodiment of any of the foregoing gas turbine engines, the center gravity is located at an intersection of a vertical line extending through a hoist point of the turbofan engine and the axis with the axis normal to the vertical line.

A method of assembling a gas turbine engine according to an exemplary embodiment of this disclosure among other possible things includes supporting a plurality of fan blades about an axis of rotation with each of the plurality of fan blades including a leading edge, supporting a turbine section including an aft most turbine blade having a trailing edge about the axis of rotation, supporting a geared architecture driven by the turbine section for rotating the plurality of fan blades about the axis, and selecting components of the gas turbine engine structure to orientate a center of gravity of the gas turbine engine located a first axial distance from the trailing edge of the aft most turbine blade that is between about 35% and about 75% of a total length between the leading edge of the plurality of fan blades and the trailing edge of the aft most turbine blade.

In a further embodiment of the foregoing method, including supporting the plurality of blades on a rotor with the rotor and fan blades having a density of between about between about 0.0094 lbs/in$^3$ and about 0.01540 lbs/in$^3$.

In a further embodiment of any of the foregoing methods, including assembling a geared architecture as a gearbox having a density of between about 0.22 lbs/lbs/in$^3$ and about 0.30 lbs/in$^3$.

In a further embodiment of any of the foregoing methods including selecting components of the gas turbine engine to orientate the center of gravity within a range of between about 40% and 70% of total length between the leading edge of the plurality of fan blades and the trailing edge of the aft most turbine blade.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
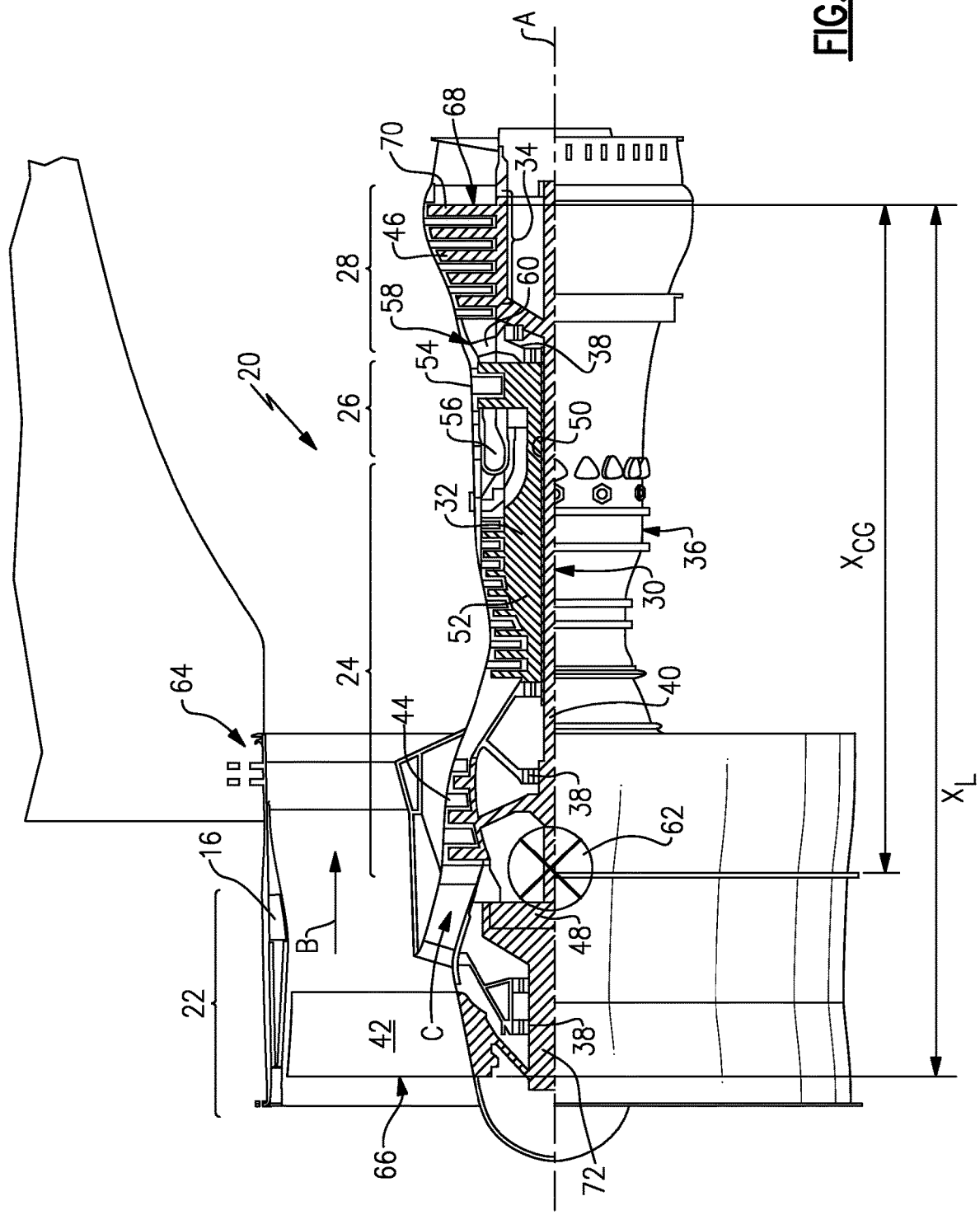
FIG. 1 is a schematic view of a center of gravity of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core flow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
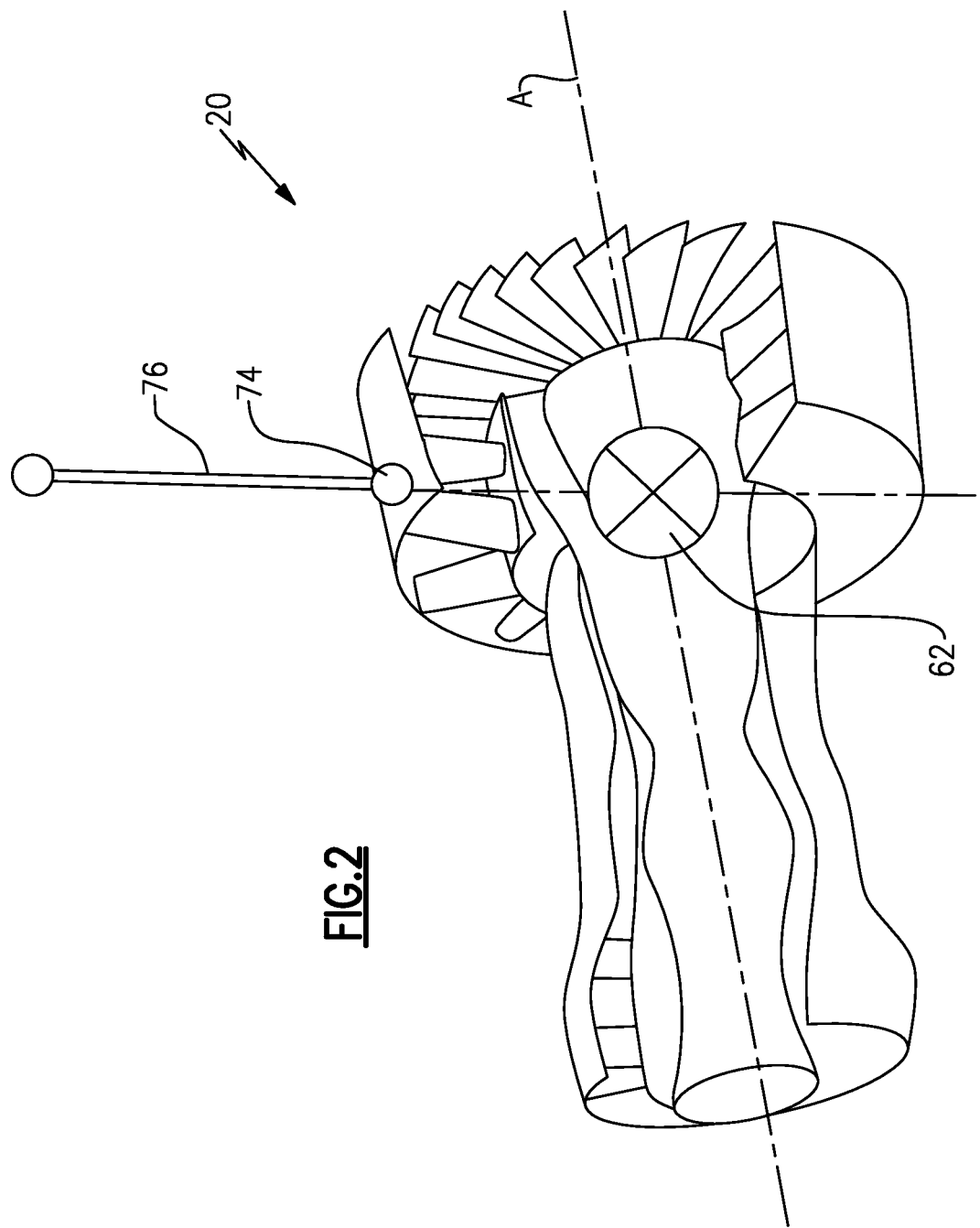
FIG. 2 is a schematic view of a center of gravity of an example gas turbine engine.

Referring to FIG. 2, with continued reference to FIG. 1, a center of gravity indicated at 62 is transferred radially to an engine centerlined disposed along the axis A. The center of gravity 62 is positioned a first distance $X_{CG}$ between forward and aft ends of the engine 20. In the disclosed example, the forward end is a leading edge 66 of the fan blades 42 and the aft end is a trailing edge 68 of an aft most rotating turbine blade 70. A total length $X_L$ is defined between the leading edge 66 and the trailing edge 68.

The position of the center of gravity 62 along the axis A is disposed at the first distance $X_{CG}$ and influences the configuration for supporting engines on an airframe and is therefore of concern to engine manufactures and aircraft designers.

In the disclosed example, a mounting structure schematically indicated at 64 supports the example gas turbine engine 20 on an airframe (not shown). It should be understood, that the location of the mounting structure 64 may vary for each engine application and such variations are within the contemplation of this disclosure.

The example gas turbine engine 20 includes the geared architecture 48 for driving the fan section 22 at a speed different than that of a fan drive turbine. In this example, the fan drive turbine is the low pressure turbine 46.

The selection of materials and component configurations define the overall weight of the engine 20 along with the distribution of that weight to determine the location of the center of gravity 62. Structures such as the fan section 22 and the geared architecture 48 along with the compressor section 24 and turbine section 28 combine to define not only the overall weight of the engine 20, but also the distribution of that weight that determines the location of the center of gravity 62.

The geared architecture 48 is a structure located forward in the engine 20 along with the fan section 22 and therefore material selection and structure configurations influence the location of the center of gravity 62. Moreover, many structures within the gas turbine engine structures factor into and determine in part the positioning and location of the center of gravity 62.

In this disclosed example, components of the geared architecture 48 such as for example journal bearings, lubrication jets, and a gutter around epicyclic components are selected to provide a weight reduction and an axial size reduction that define an overall weight of the geared architecture 48 and thereby factor into the definition of the center of gravity 62. In one disclosed example, the weight of the geared architecture is stated as a density to relate the overall size or volume of the geared architecture to a weight. In this example, the example geared architecture is a gearbox having a density between about 0.22 lbs/in³ and about 0.30 lbs/in³. The part density of the gearbox is one consideration that influences the position of the center of gravity 62.

Additionally, the fan section 22 is the one of the forward most components of the example engine and therefore also has a significant influence on the final location of the center of gravity 62 in a completed engine 22. Accordingly, selection of parts making up the fan section 22 is considered not only in view of propulsive efficiencies, but also in regard to the overall structure of the gas turbine engine 20.

In the disclosed example, the fan section 22 includes a rotor 72 that supports the plurality of fan blades 42 for rotation about the axis A. The rotor 72 arrangement that folds radially back around the bearings 38 provides a weight benefit and thereby provides another means for modifying and positioning the engine center of gravity 62. Moreover, the rotor bearing 38 can include tapered roller bearings that further provide a beneficial impact on the structure of the fan section without adding additional weight to further influence the location of the center of gravity 62.

A density of the fan rotor can be further selected to utilize light weight structures that further correspond and effect the location of the center of gravity 62. In this example, the fan section 22, including the rotor 72 and the plurality of fan blades combine to provide a density within a range of between about 0.0094 lbs/in³ and about 0.01540 lbs/in³.

Additionally, a fan containment case 16 is required to contain the blades 42 and is fabricated from a composite material to reduce weight and is a selection that determines the location of the center of gravity 62.

Utilizing these and other configuration parameters and material selection options, the example geared turbofan engine has an internal moment arm that is a measure of the location of the engine center of gravity 62. The example internal moment arm is within a range of between about 40% and 70% of the length of the engine 20 according to the following relationship.

The internal moment arm MA is defined as:

$$MA = [\text{axial distance between the Center of}$$
$$\text{Gravity (transferred radially to the centerline of the engine)} -$$

-continued (the location of the trailing edge of the last stage of the turbine section)]

[axial distance between the front edge of the front fan and the trailing edge of last stage of the turbine section]

In this example $MA=X_{CG}/X_L$.

Accordingly, for a geared turbofan gas turbine engine the position of the center of gravity 62 is related as a moment arm according to the above equation and is within a range of between about 35% and about 75% of the total length $X_L$ between the leading edge 66 of the fan blades 42 and the trailing edge 68 of the aft most rotating turbine blade 70. In another disclosed embodiment the example moment arm MA for the example engine 20 is within a range of between about 40% and about 70% of the total length $X_L$ between the leading edge 66 of the fan blades 42 and the trailing edge 68 of the aft most rotating turbine blade 70.

The location of the center of gravity 62 for the disclosed geared gas turbine engine is only about 30% longer than direct drive turbine engines in the prior art. Table 1 below includes further disclosed example embodiments of a geared turbofan engine moment arms MA.

TABLE 1

| Engine | CG station (inches) | Fan LE station | LPT last blade TE elation | MA as a percent of engine length |
|---|---|---|---|---|
| 1 | 205.29 | 158 | 251 | 49.2% |
| 2 | 203.31 | 152 | 253.3 | 49.3% |
| 3 | 203.9 | 149.4 | 258 | 49.8% |

The disclosed moment arms MA represents the location of the center of gravity 62 as a percentage of the engine length $X_L$ (FIG. 1) measured between the leading edge 66 of the fan blade 72 and the trailing edge 68 of the last rotating turbine blade 70 in the low pressure turbine 46.

Referring to FIG. 2, although complex calculations can be utilized to determine the physical location of the center of gravity 62 of any engine, another means exists for determined this location for any engine. A hoist point 74 located on the engine 20 will be axially located at the center of gravity 62 when the engine center line or axis A is normal to a vertical line 76 extending through the hoist point 74 and intersecting the axis A. Accordingly, it this example the center of gravity 62 may in one example be determined as that point where the vertical line 76 intersects the engine center line or axis A at a right angle when supported at a single hoist point 74.

The example engine center of gravity 62 is considered along the engine centerline or axis A although the actual center of gravity 62 may be slightly skewed from the axis A due to locally mounted accessory components.

The disclosed center of gravity 62 includes fluids contained within operating systems of the turbofan engine 20. However, the example center of gravity does not include some structures such as for example typical tubes, brackets and harness such as those coming from the airframe which would have almost no effect on the location of the center of gravity 62. Moreover, the example center of gravity 62 is determined for a bare engine only that does not include engine mounts, a fan cowl, a thrust reverser, an inlet, nozzle or plug. In other words, the example center of gravity 62 is not determined including weights of structures comprising the gas turbine engine not including engine mounting structures, engine cowling structures and nacelle structures.

Accordingly, through selection of materials and design of structures such as the fan section and geared architecture, the center of gravity 62 can be located in a structurally desirable location to increase propulsive efficiencies and reduce mounting structure requirements.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
a plurality of fan blades rotatable about an axis, wherein each of the plurality of fan blades includes a leading edge, wherein the plurality of fan blades comprises no more than 20 fan blades;
a compressor section at least partially defining a core flow path and a bypass flow path, wherein a bypass ratio is greater than ten;
a turbine section including an aft most turbine blade, wherein the aft most turbine blade includes a trailing edge; and
a geared architecture driven by the turbine section for rotating the plurality of fan blades about the axis;
wherein a center of gravity of the gas turbine engine is located a first axial distance from the trailing edge of the aft most turbine blade that is between 40% and 70% of a length between the leading edge of the plurality of fan blades and the trailing edge of the aft most turbine blade.

2. The gas turbine engine as recited in claim 1, wherein the center of gravity is disposed along the axis.

3. The gas turbine engine as recited in claim 1, wherein the center of gravity is determined including weights of structures comprising the gas turbine engine not including engine mounting structures, engine cowling structures and nacelle structures.

4. The gas turbine engine as recited in claim 3, wherein the center of gravity is determined including weights of fluids contained within operating systems of the gas turbine engine.

5. The gas turbine engine as recited in claim 1, wherein the plurality of fan blades are supported on a rotor with the rotor and fan blades having a density of between 0.0094 lbs/in$^3$ and 0.01540 lbs/in$^3$.

6. The gas turbine engine as recited in claim 5, wherein the geared architecture comprises a gearbox having a density of between 0.22 lbs/in$^3$ and 0.30 lbs/in$^3$.

7. The gas turbine engine as recited in claim 1, wherein the center of gravity is located at an intersection of a vertical line extending through a hoist point of the gas turbine engine and the axis with the axis normal to the vertical line.

8. A turbofan engine comprising
a plurality of fan blades rotatable about an axis, wherein each of the plurality of fan blades includes a leading edge;
a bypass passage for a bypass airflow, wherein a bypass ratio is greater than ten;
a turbine section including an aft most rotating turbine blade, wherein the aft most rotating turbine blade includes a trailing edge, wherein the turbine section includes a low pressure turbine section and a ratio between a number of the plurality of fan blades and a number of low pressure turbine rotors is between 3.3 and 8.6; and a geared architecture driven by the turbine section for rotating the plurality of fan blades about the axis;

wherein an internal moment arm of the turbofan engine has a ratio of a first distance from a center of gravity of the turbofan engine to the trailing edge of the aft most rotating turbine blade to a length between the leading edge of the plurality of fan blades and the trailing edge of the aft most turbine blade that is between 40% and 70%.

9. The turbofan engine as recited in claim 8, wherein the geared architecture comprises a gearbox having a density of between 0.22 lbs/in$^3$ and 0.30 lbs/in$^3$.

10. The turbofan engine as recited in claim 9, including a rotor supporting the plurality of fan blades with the rotor and fan blades having a density of between 0.0094 lbs/in$^3$ and 0.01540 lbs/in$^3$.

11. The turbofan engine as recited in claim 8, wherein the center of gravity is determined including weights of fluids contained within operating systems of the turbofan engine.

12. The turbofan engine as recited in claim 8, wherein the center of gravity is located at an intersection of a vertical line extending through a hoist point of the turbofan engine and the axis with the axis normal to the vertical line.

13. A method of assembling a gas turbine engine comprising:
    supporting a plurality of fan blades about an axis of rotation with each of the plurality of fan blades includes a leading edge;
    supporting a compressor section at least partially defining a core flow path and a bypass flow path, wherein a bypass ratio is greater than ten;
    supporting a turbine section including an aft most turbine blade, wherein each of the aft most turbine blade includes a trailing edge about the axis of rotation;
    supporting a geared architecture driven by the turbine section for rotating the plurality of fan blades about the axis;
    selecting components of the gas turbine engine structure to orientate a center of gravity of the gas turbine engine located a first axial distance from the trailing edge of the aft most turbine blade that is between 35% and 75% of a length between the leading edge of the plurality of fan blades and the trailing edge of the aft most turbine blade.

14. The method as recited in claim 13, including supporting the plurality of fan blades on a rotor with the rotor and fan blades having a density of between about between 0.0094 lbs/in$^3$ and 0.01540 lbs/in$^3$.

15. The method as recited in claim 13, including assembling a geared architecture as a gearbox having a density of between 0.22 lbs/in$^3$ and 0.30 lbs/in$^3$.

16. The method as recited in claim 13, further defined by selecting components of the gas turbine engine to orientate the center of gravity within a range of between 40% and 70% of a total length between the leading edge of the plurality of fan blades and the trailing edge of the turbine blades of the aft most turbine rotor.

17. The gas turbine engine as recited in claim 1, wherein the turbine section includes a low pressure turbine section with no more than six (6) turbine rotors.

18. The gas turbine engine as recited in claim 17, wherein the low pressure turbine section includes no more than three (3) turbine rotors.

19. The gas turbine engine as recited in claim 18, wherein the turbine section includes a high pressure turbine section with two (2) turbine rotors.

20. The gas turbine engine as recited in claim 17, wherein the low pressure turbine has a pressure ratio that is greater than five (5).

* * * * *